(12) United States Patent
Berger et al.

(10) Patent No.: US 7,246,535 B2
(45) Date of Patent: Jul. 24, 2007

(54) METHOD FOR THE RECOGNITION OF THE SYNCHRONIZATION POSITION AND THE END OF THE SYNCHRONIZATION OPERATION OF AN AUTOMATED SHIFTABLE TRANSMISSION

(75) Inventors: Reinhard Berger, Buehl (DE); Martin Vornehm, Buehl (DE); Stefan Winkelmann, Buehl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 258 days.

(21) Appl. No.: 10/470,831

(22) PCT Filed: Jan. 21, 2002

(86) PCT No.: PCT/DE02/00159

§ 371 (c)(1),
(2), (4) Date: Jul. 30, 2003

(87) PCT Pub. No.: WO02/061307

PCT Pub. Date: Aug. 8, 2002

(65) Prior Publication Data

US 2004/0063541 A1    Apr. 1, 2004

(30) Foreign Application Priority Data

Jan. 31, 2001   (DE) ............................... 101 04 102
May 31, 2001   (DE) ............................... 101 26 708

(51) Int. Cl.
*F16H 59/00* (2006.01)
*F16H 61/00* (2006.01)
*F16H 63/00* (2006.01)

(52) U.S. Cl. ..................................... 74/335; 74/473.12
(58) Field of Classification Search ................. 74/335, 74/473.11, 473.12; 701/53
See application file for complete search history.

(56) References Cited

U.S. PATENT DOCUMENTS

| | | | | |
|---|---|---|---|---|
| 4,911,031 A | * | 3/1990 | Yoshimura et al. ........... | 74/335 |
| 5,218,541 A | * | 6/1993 | Sakakibara et al. ........... | 701/65 |
| 5,709,129 A | * | 1/1998 | Clezio ...................... | 74/336 R |
| 5,979,258 A | * | 11/1999 | Nakano ..................... | 74/336 R |
| 6,116,391 A | * | 9/2000 | Kremmling et al. ........ | 192/3.58 |
| 6,209,408 B1 | * | 4/2001 | DeJonge et al. .............. | 74/335 |
| 6,230,576 B1 | * | 5/2001 | Yamada et al. ............... | 74/335 |
| 6,564,662 B2 | * | 5/2003 | Yamamoto et al. ........... | 74/335 |

FOREIGN PATENT DOCUMENTS

| | | |
|---|---|---|
| DE | 199 14 394 | 6/2000 |
| EP | 0 373 273 | 6/1990 |
| FR | 2 764 031 | 12/1998 |

* cited by examiner

*Primary Examiner*—Tisha Lewis
(74) *Attorney, Agent, or Firm*—Michael Best & Friedrich LLP

(57) ABSTRACT

A method for recognition of the synchronization position and the end of the synchronization operation in an automated shiftable transmission with an electromotive shift actuator is disclosed, which is characterized in that the rotational speed of the shift actuator is detected and the synchronization position, as well as the end of the synchronized operation, is determine based upon the change of the rotational speed.

25 Claims, 3 Drawing Sheets

METHOD FOR THE RECOGNITION OF THE SYNCHRONIZATION POSITION AND THE END OF THE SYNCHRONIZATION OPERATION OF AN AUTOMATED SHIFTABLE TRANSMISSION

CROSS-REFERENCE

This application is the US national stage application of International Application No. PCT/DE02/00159, which claims priority to German patent application nos. 101 04 102.0 and 101 26 708.8.

TECHNICAL FIELD

The present invention relates to methods and apparatus for recognizing the synchronization position and the end of the synchronization operation of an automatic shiftable transmission having an electrically-driven shift actuator.

BACKGROUND OF THE RELATED ART

Shiftable transmissions for motor vehicles have long been known in many different forms. In the past, a shiftable transmission was primarily understood to be a manually-shiftable transmission, in which the driver of a motor vehicle equipped with this type of shiftable transmission selects the shift path and performs the gear shift operation by hand via a shift lever. In addition to these manually-shiftable transmissions, it has also been known in the meantime to use automated shiftable transmissions when the operation of selecting and shifting the selected gear stage is executed, for example, according to programmed control by actuators provided in the shiftable transmission.

During operation, an automated shiftable transmission of this kind is subjected to normal wear and tear on its component parts, e.g., the synchronizing means, which wear and tear can lead to displacement of the middle synchronization position. The middle synchronization position is defined herein as a mean position value during the synchronization operation. The blocking position of the synchronizing means can vary somewhat from shift operation to shift operation, because the shift sleeve can engage in the synchronizer ring differently and unpredictably from shift operation to shift operation.

However, accurate knowledge of the synchronization position is important, as the synchronization position should be quickly reached by the shift actuator in order to shorten the shift time. In addition, the shift actuator should also quickly arrive at its end position (i.e., the gear engaged position) at the end of the synchronization operation.

When the shift actuator reaches the synchronization position, the synchronizing means exerts a blocking effect on the shift actuator as a result of the synchronization operation, which leads to an increase in the load current of the actuators. It has already been known to detect the start of the synchronization by this increase in the load current.

However, detecting the load current is comparatively complicated and expensive and furthermore, can only produce a result with regard to a change of the synchronization position within the bounds of a continuous determination of the actuator position, as the position of the actuator when the load current increases must be known.

SUMMARY OF THE INVENTION

Thus, an object of the present invention is to provide methods and apparatus, by which, in a less expensive manner, a change of the synchronization position and the end of the synchronization operation can be recognized.

The invention is achieved by the solution of this object in accordance with the features and aspects of the present teachings provided herein. Advantageous embodiments of these features and aspects are described further below and a representative apparatus for performing methods according to the present teachings is shown in FIG. 5. Reference to elements shown in FIG. 5 is provided throughout this summary and the following detailed description.

According to the invention, methods and apparatus for recognizing the synchronization position and the end of the synchronization operation of an automated shiftable transmission 11 having an electromotive shift actuator 13 are provided, in which the rotational speed of the shift actuator 13 is detected and the synchronization position, as well as the end of the synchronization operation, are determined based upon changes in the rotational speed.

By detecting the rotational speed of the shift actuator 13 over time, it is possible to determine the path along which the shift actuator 13 has moved. Therefore, even without a continuous determination of the actuator position, according to this method, it is possible to determine that the synchronization position that has been reached when the rotational speed of the shift actuator 13 undergoes a predetermined threshold value (rotational speed) change within a predetermined time interval.

The rotational speed of the shift actuator 13 can be detected by sensors 14 that generate a predetermined number of pulses per revolution of the actuator shaft. By measuring the pulse frequency and/or the timed pulse interval, it is possible to determine the rotational speed of the shift actuator 13. It is also possible to determine geometric intervals by adding the pulses.

Therefore, according to the invention, if it is determined that the rotational speed of the shift actuator 13 has experienced a clear decline (reduction) within a certain time interval, then it is concluded that the synchronization position has been reached.

During the synchronization operation, a synchronizing means 12 temporarily exerts a blocking effect against further movement of the shift actuator 13. When the blocking effect is released at the end of the synchronization operation, the rotational speed of the shift actuator 13 will increase again.

Because the wear behaviour of the automated shiftable transmission 11 can lead to gear-specific changes in the shift characteristics of the transmission 11, it is proposed according to the invention that the synchronization position is determined independently of the end of the synchronization operation for each gear stage of the automated shiftable transmission 11.

By using such a method according to the invention, it is therefore possible to identify gear-specific changes of the synchronization position and also to determine the gear-specific end of the synchronization operation.

Changes in the synchronization position of the relevant gear stages of the automated shiftable transmission 11 during operation can therefore be taken into account by determining the synchronization position and by using this synchronization position as the assumed target synchronization position during the next gear change operation for the relevant gear stage in order to control the shift actuator 13. Similarly, by continuously monitoring the rotational speed of the shift actuator 13, it is possible to determine whether the synchronization operation has concluded. The end of the synchronization operation can be recognized, e.g., by a parabolic or a generally linear increase in the rotational speed of the shift actuator 13 over time.

In this way, it is therefore possible to determine (a) changes in the synchronization position in the direction towards the neutral position of the transmission or away from same, and also (b) changes in the time duration of the synchronization operation. Thus, for example, if the current supply to the shift actuator 13 is increased before the conclusion of the synchronization operation, only an insignificant acceleration of the shift actuator 13, and thus a small change of its rotational speed, results. Consequently, it can be concluded from this small speed change that the synchronization operation has not yet ended. This knowledge can then be used during a subsequent gear change operation and a corresponding synchronization so as to accordingly delay the start of the increase of the current supply to the shift actuator 13, thereby avoiding a stretching of the shift elasticity.

Conversely, if the end of the synchronization is known, it is therefore possible to increase the load current for the shift actuator 13 without any further delay, so that the end position of the shift actuator 13 on its travelling path to the engaged gear stage can be rapidly reached. This leads to a shortening of the travelling time of the shift actuator 13 to reach the end position and thus to a shortening of the time required for completion of the gear shift operation.

It is thereby proposed according to the invention that the determined synchronization position is stored in a memory device 16. Then, at the next gear change operation, the determined synchronization position is read out from the memory device 16 and is used as the target synchronization position for movement to the synchronization position effected by the shift actuator 13. For this purpose, a volatile memory can be provided and the determined synchronization position is stored in the volatile memory during operation of the shiftable transmission. Therefore, the gear-specific last synchronization positions, which are in use when the automated shiftable transmission equipped motor vehicle is stopped, can be utilized during the next vehicle driving operation. These values may then be written into a non-volatile memory after stopping the vehicle, e.g., which vehicle stoppage is controlled by an ignition signal, and then read out during the next vehicle start-up so as to be again stored in the volatile memory.

The stored synchronization position is thereby up-dated with the actually determined synchronization position when the stored synchronization position deviates from the determined synchronization position. Therefore, changes in the synchronization position will not lead to changes in the shift characteristics of the transmission 11.

It is further proposed according to the invention that the up-dating is performed when the determined synchronization position changes, as compared with the stored synchronization position, for the individual gear stages of the automated shiftable transmission 11, in different directions in relation to the neutral position. In other words, this means, e.g., that an up-date will be performed when the actually determined synchronization position of the first gear is displaced towards the neutral position and the actually determined synchronization position of the third gear is displaced in a direction away from the neutral position On the other hand, when the gear-specific synchronization positions for all gears have changed or have been displaced in the same direction, it can be assumed that the entire shift pattern has moved altogether. Therefore, an adaptation (change) of the synchronization position for the individual gear stages is not necessary in this case.

According to a further development of the method according to the invention, it is further proposed that the up-date is performed only when the shiftable transmission 11 has warmed up to its operating temperature, wherein a sensor is provided on the shiftable transmission in order to detect the temperature thereof and/or a predetermined operating time of the shiftable transmission is allowed to elapse in order to ensure that the transmission has been sufficiently operated to have reached its normal operating temperature. An allowance is thereby made of the fact that, if the operating parameters of the automated shiftable transmission 11 do not remain substantially the same, such as e.g. the oil viscosity within the transmission 11, an adaptation mistake could result. Such a mistake can be avoided by waiting to perform the up-date until the transmission 11 has warmed up to its operating temperature.

The stored synchronization position is used to control the shift actuator 13, so that the shift actuator 13 reduces the speed of the travelling movement of the shift elements in the shiftable transmission 11 before reaching the target synchronization position. A large mechanical strain on the shift actuator 13 and shift elements is thereby avoided.

According to another aspect of the present teachings, when a change (displacement) of the synchronization position in relation to the neutral position is determined to exceed a predetermined threshold displacement distance, an action notification is issued. This action notification can be, e.g., a corresponding entry in the fault memory of the vehicle. In this case, when the next vehicle maintenance is done, suitable remedial measures can be performed, such as e.g., replacing worn synchronizing rings in the transmission 11.

BRIEF DESCRIPTION OF THE DRAWINGS

The invention will now be explained in further detail with reference to the drawings in which.

DETAILED DESCRIPTION OF THE INVENTION

Figure 1:
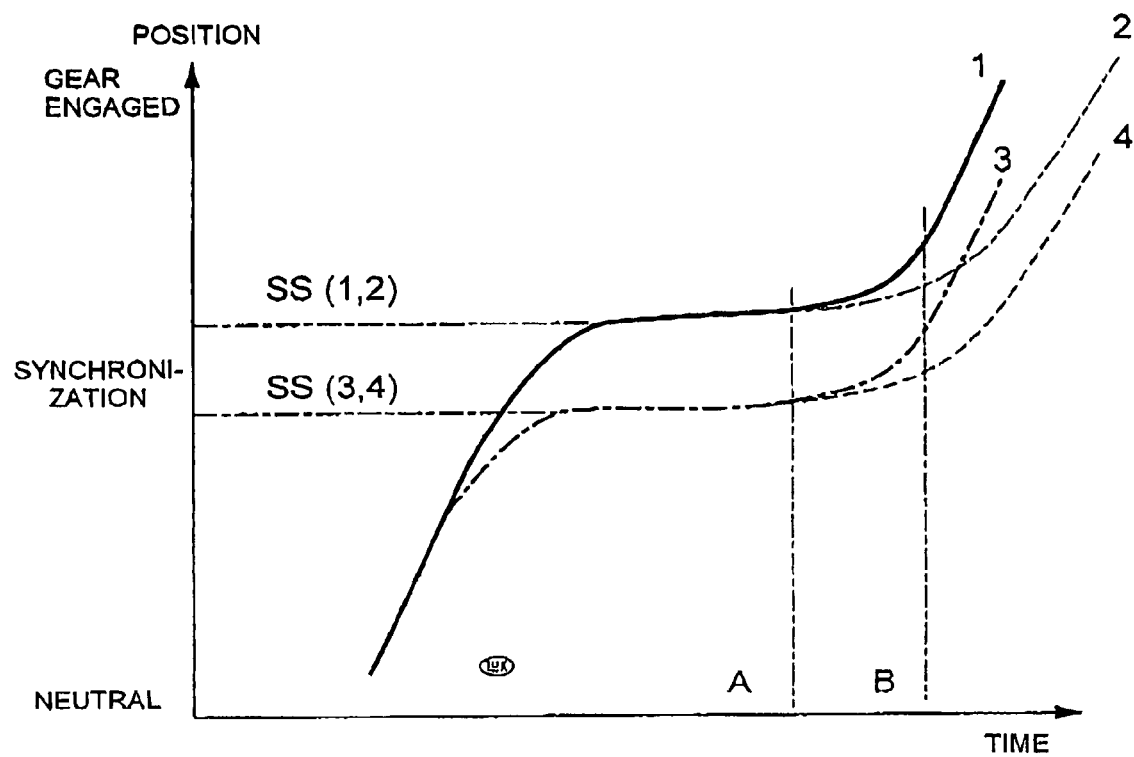
FIG. 1 shows a graphic illustration of the position of the shift actuator 13 over time during a transmission synchronization operation.

In FIG. 1, the curved lines 1 and 2 each represent the shift operation when a "neutral-distant" synchronization position is present, while the curved lines 3 and 4 each represent the shift operation for a "neutral-close" synchronization position. According to the term "neutral-distant," a change (displacement) of the synchronization position, as determined by a controller 15, away from the neutral position is meant and, according to the term "neutral-close," a change (displacement) of the determined position in a direction towards the neutral position is correspondingly meant.

As shown in FIG. 1, the shift actuator 13, as illustrated over time, is at first moved linearly and is then braked near the synchronization position or synchronization operation. A blocking effect is exerted against further movement of the shift actuator 13 during the synchronization operation. Therefore, this means that the shift actuator 13 is braked and becomes practically stationary until time point A. However, a force is continued to be applied to the shift actuator 13 and the continued application of the force leads, after time point B, to an acceleration of the shift actuator 13, and thereby an increase in the rotational speed of the shift actuator 13.

Curved line 1 shows a parabolic-shaped path with a high acceleration, whereas curved line 2 represents a path with a reduced acceleration. Because the beginning of the controlled acceleration of the shift actuator 13 according to curved line 2 would be selected too early, the blocking effect of the synchronization would still be exerted against the shift actuator 13 and thus only a slight acceleration of the shift actuator 13 would result. By monitoring the rotational speed of the shift actuator 13 during a next following shift operation, a path can therefore be utilized according to curved line 1, by which the controlled acceleration starts later, i.e., after the blocking action of the synchronization has ceased. This later acceleration leads to an overall faster shift operation, because the acceleration is greater, and also leads to a reduction of the mechanical strain on the shift actuator 13 and the synchronizing means 12, because the shift actuator 13 does not work against synchronization while the synchronizing means 12 is still exerting the blocking effect.

Curved lines 3 and 4 of FIG. 1 show similar conditions with a synchronization position closer to the neutral position. By detecting the end of the synchronization operation, it is thus also possible with a synchronization position lying closer to the neutral position to change the position of the shift actuator 13, as expressed by curved line 3, and thus to attain a reduction in the shift time. In comparison, curved line 4 shows again, for clarity, a premature assumed end of the synchronization operation with a corresponding lengthening of the time period until reaching the end position of the shift actuator 13, i.e., the "gear engaged" position.

Figure 2:
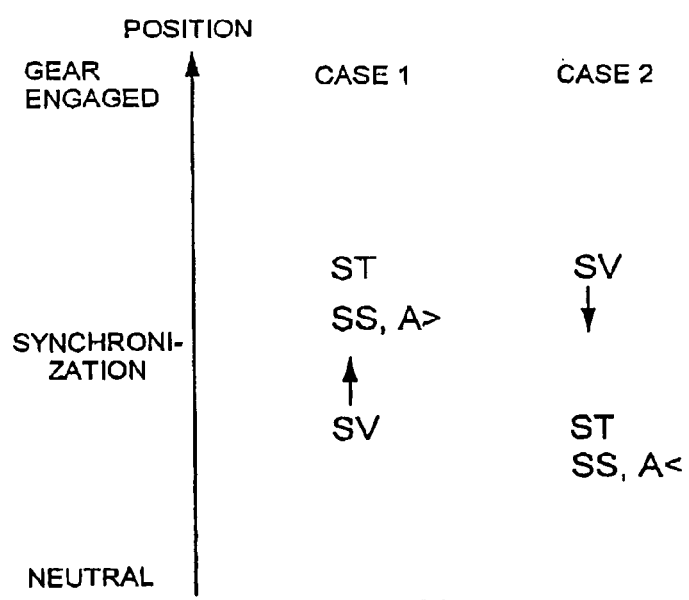
FIG. 2 shows an illustration to explain the identification of displacements of the synchronization position with respect to the neutral position and the gear engaged position.

Using two examples (cases), FIG. 2 shows that a change in the synchronization position can be concluded or recognized.

Figure 5:
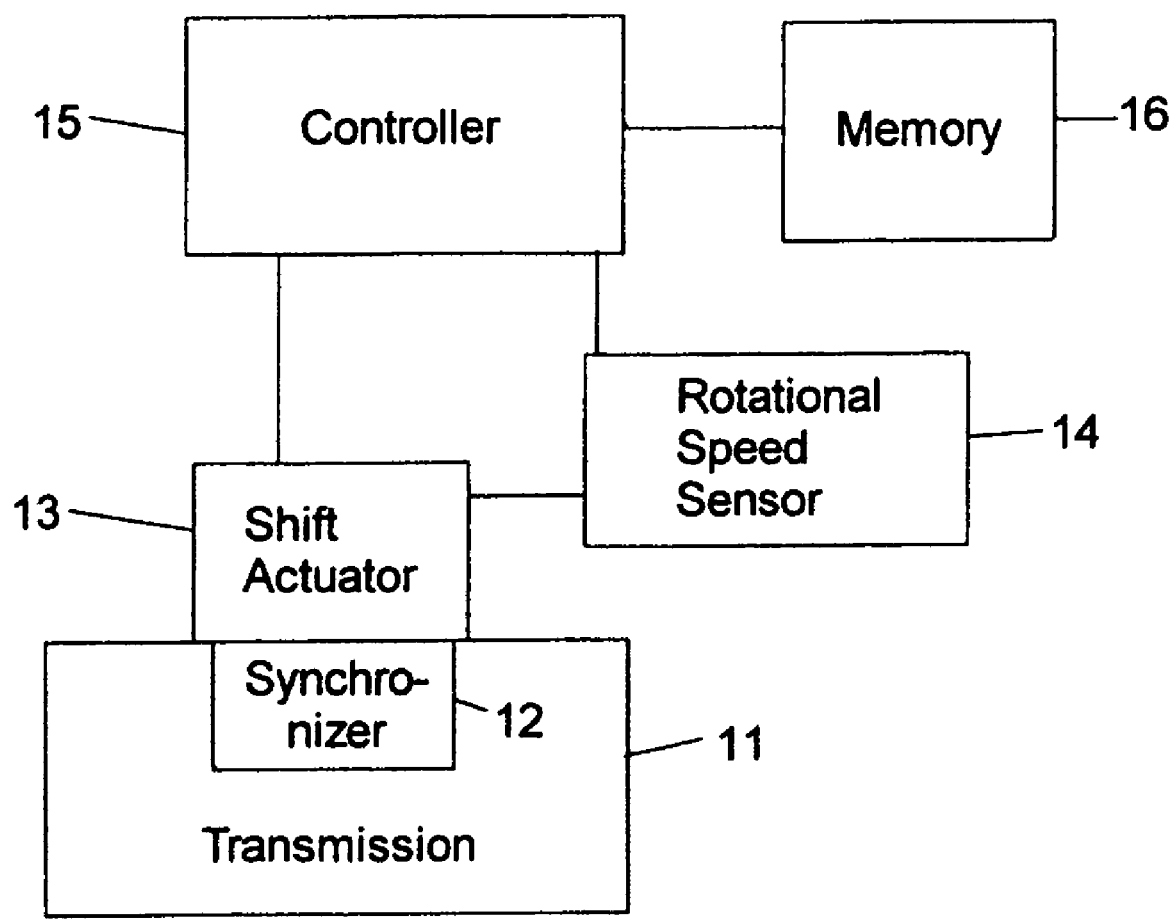
FIG. 5 shows a representative apparatus for performing the methods described herein.

In the example illustrated in Case 1, the actual synchronization position (ST) lies farther away from the neutral position than the synchronization position (SV), which was utilized or assumed by the controller 15 (e.g., stored in memory 16), which are shown in FIG. 5. This fact is concluded because the stationary position (SS) was determined to be above the utilized (stored) synchronization position SV. This stationary position (SS) is also shown in FIG. 1 and corresponds to the position of the shift actuator 13 after braking (i.e., the horizontal portion of the curved lines shown in FIG. 1) and is utilized during the synchronization operation.

At the end of the synchronization operation, a large acceleration (A>) is apparent, which corresponds in FIG. 1 to the portion of curved lines 1–4 that is characterized as a steep parabola, so that an adaptation, i.e. a correction of the assumed synchronization position (SV) utilized by the controller 15, is appropriate. This determined synchronization position can then be stored as the new target synchronization position in the memory 16 of the controller 15.

Case 2 shows that the actual synchronization position (ST) lies closer to the neutral position than the assumed (stored) synchronization position (SV). A low acceleration (A<) is present. Because the assumed synchronization position (SV) was assumed to be above the stationary position (SS) and the actual synchronization position (ST), the actuator 13 has had to work against the blocking effect of the synchronizing means 12 during the synchronization operation. An adaptation of the assumed (stored) synchronization position (SV) in the direction closer to the neutral position is thus appropriate.

Figure 3:
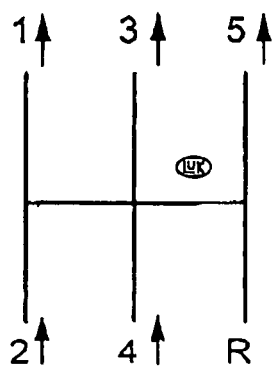
FIG. 3 shows an illustration for explaining a unidirectional displacement of the entire shift pattern.

FIG. 3 shows an illustration to explain a unidirectional displacement of the entire shift pattern. In relation to the neutral position, a change (displacement) of the synchronization position for each forward gear has occurred in the same direction, which direction change is shown by the upwardly directed arrows. Therefore, it can be concluded that the entire shift pattern has moved altogether and an adaptation of the assumed synchronization position (SV) by the controller 15 is thus not necessary.

Figure 4:
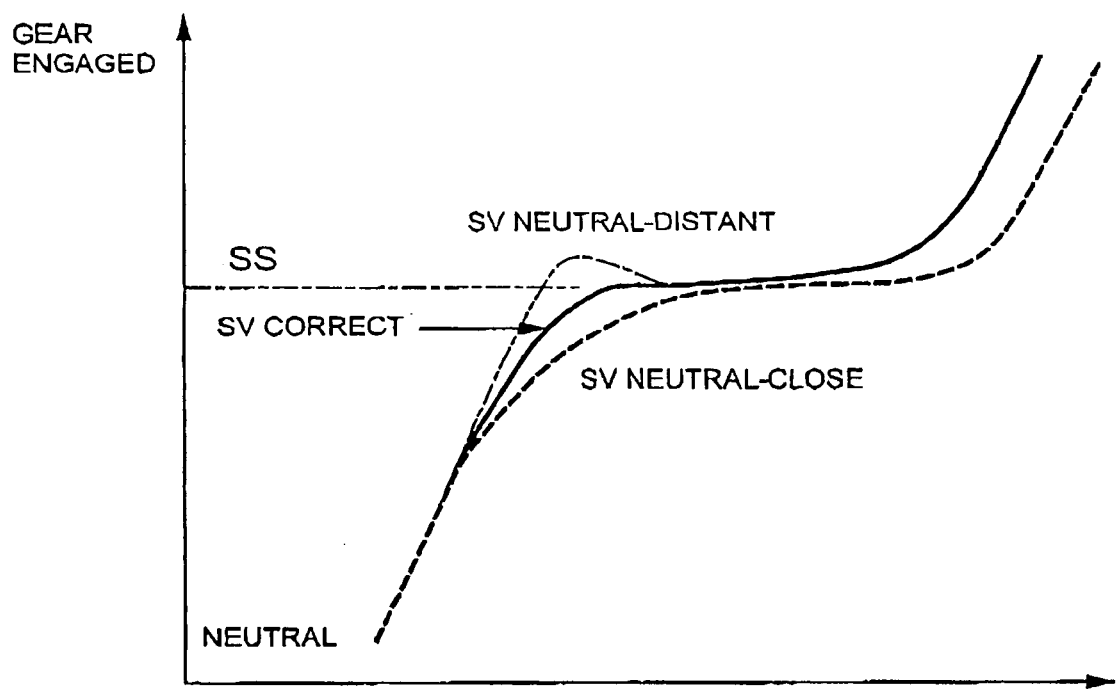
FIG. 4 shows an illustration for explaining the importance of the synchronization position.

Lastly, FIG. 4 serves to explain the importance of the synchronization position. The controller 15 uses the assumed synchronization position SV to brake the shift actuator 13 just before reaching the stationary position SS. This acceleration/braking pattern enables arrival at the stationary position SS as fast as possible, thereby shortening the time for the gear change operation, without however "moving into" the synchronization position with a still high speed of the shift actuator, as this would result in a "bounce back" of the shift actuator 13, due to the blocking effect being exerted by the synchronizing means 12.

If the assumed synchronization position SV used by the controller 15 is located too far in the neutral-distant direction (i.e., away from the neutral position), then no braking takes place before reaching the actual synchronization position ST and the shift actuator 13 must absorb the forces that are generated by the direct contact with the synchronizing means 12, which leads to the above-noted bounce-back. With a too neutral-close assumed synchronization position SV (i.e., the assumed synchronization position SV is too close to the neutral position), the result is a premature braking of the shift actuator 13. In this case, the shift actuator 13 will "creep" slowly towards the stationary position SS and the duration of the drive force interruption during a gear change operation will increase accordingly. These changes will have the effect of reducing shift comfort. But, with a correctly assumed synchronization position SV (e.g., as a result of an adaptation performed at the previous shift operation), the high mechanical strain on the shift actuator 13, on the one hand, ceases and on the other hand, a short time results for the gear change operation. Consequently, the drive force interruption is relatively short.

For further features of the invention, which have not been explained in more detail above, reference is expressly made to the claims.

The patent claims filed with the application are proposed wordings without prejudice to obtaining broader patent protection. The applicant reserves the right to claim further combinations of features disclosed until now only in the description and/or drawings.

References made in the dependent claims refer to the further design of the subject of the main claim using the features of the relevant dependent claims; they are not to be regarded as dispensing with obtaining an independent subject protection for the combination of features of the dependent claims referred to.

Since the subject matter of the dependent claims can form independent inventions, as compared with prior art known by the priority date of this application, the applicant reserves the right to make them the subject of independent claims or divisional applications. They can also contain independent inventions that have a configuration independent of the subjects of the preceding dependent claims.

The embodiments are not to be regarded as restricting the invention. Rather, numerous modifications and amendments are possible within the scope of the present disclosure, in particular, those variations, elements and combinations and/ or materials that can be derived by the expert as a solution of the object, for example, by combination or modification of individual features, elements or method steps contained in the drawings and described in connection with the general description and embodiments as well as claims, and by combinable features that lead to a new subject or new method steps or sequence of method steps, insofar as they relate to manufacturing, test and work methods.

The invention claimed is:

1. A method comprising:
   detecting a rotating speed of a shift actuator of an automated shiftable transmission,
   determining a synchronization position of the transmission based upon a first change of the detected rotating speed,
   determining an end of a transmission synchronization operation based upon a second change of the rotating speed,
   storing the determined synchronization position in a memory device,
   up-dating the stored synchronization position with a newly determined synchronization position when the stored synchronization deviates from the newly determined synchronization position, wherein the up-dating is performed only when the newly determined synchronization position includes differently-directed displacements with respect to a neutral position, and as compared with the stored synchronization position, for at least two different gear stages of the transmission,
   subsequently reading out the stored synchronization position from the memory device, and
   controlling movement of the shift actuator during the transmission synchronization operation according to the stored synchronization position.

2. A method according to claim 1, wherein the synchronization position is determined based upon a reduction of the detected rotating speed of the shift actuator.

3. A method according to claim 2, wherein the end of the synchronization operation is determined based upon an increase of the detected rotating speed of the shift actuator.

4. A method according to claim 3, further comprising determining the synchronization position and the end of the synchronization operation for each of a plurality of gear stages of the automated shiftable transmission.

5. A method according to claim 1, further comprising warming up the transmission to its normal operating temperature before the up-dating is performed.

6. A method according to claim 5, wherein a sensor is provided on the transmission and the method further comprises detecting the temperature of the transmission during warm up in order to determine when the transmission has reached its operating temperature.

7. A method according to claim 5, further comprising allowing a predetermined time period to elapse following initiation of transmission operation before the up-dating is performed.

8. A method according to claim 5, further comprising controlling movement of the shift actuator using the stored synchronization position so as to reduce a traveling speed of shift elements in the transmission prior to reaching the stored synchronization position.

9. A method according to claim 8, further comprising issuing an action notification when a change in the stored synchronization position relative to the neutral position has exceeded a predetermined change threshold value.

10. A method according to claim 9, further comprising shortening the traveling time of the shift actuator to arrive at an end position by adapting the stored synchronization position.

11. A method according to claim 1, wherein the end of the synchronization operation is determined based upon an increase of the detected rotating speed of the shift actuator.

12. A method according to claim 1, further comprising determining the synchronization position and the end of the synchronization operation for each of a plurality of gear stages of the automated shiftable transmission.

13. A method according to claim 1, further comprising controlling movement of the shift actuator during the transmission synchronization operation using the stored synchronization position so as to reduce a traveling speed of shift elements in the transmission prior to reaching the stored synchronization position.

14. A method according to claim 1, further comprising issuing an action notification when a change in the synchronization position relative to the neutral position has exceeded a predetermined change threshold value.

15. A method according to claim 1, further comprising shortening a traveling time of the shift actuator to arrive at the end position by modifying the synchronization position.

16. An apparatus comprising:
   means for detecting a rotating speed of a shift actuator of an automated shiftable transmission,
   means for determining a synchronization position of the transmission based upon a first change of the detected rotating speed,
   means for determining an end of a transmission synchronization operation based upon a second change of the rotating speed, and
   means for issuing an action notification when a change in the synchronization position relative to a neutral position has exceeded a predetermined change threshold value.

17. An apparatus according to claim 16, further comprising:
   a memory device storing the determined synchronization position,
   means for reading out the stored synchronization position from the memory device, and
   means for up-dating the stored synchronization position with a newly determined synchronization position when the stored synchronization position deviates from the newly determined synchronization position.

18. An apparatus comprising:
   a sensor arranged and constructed to continuously monitor a rotating speed of a shift actuator of an automated shiftable transmission, and
   a controller receiving rotating speed data from the sensor, the controller being programmed to:
      identify a mean synchronization position of the transmission when the controller determines that the rotating speed data has changed within a first predetermined time period by an amount that is greater than a first predetermined threshold change value, and
      identify an end of a transmission synchronization operation when the controller subsequently determines that the rotating speed data has changed within a second predetermined time period by an amount that is greater than a second predetermined threshold change value.

19. An apparatus according to claim 18, further comprising a memory device storing the identified synchronization position, and wherein the controller is further programmed to:
   read out a stored determined synchronization position from the memory device, and
   up-date the stored synchronization position with a newly identified synchronization position when the stored synchronization position deviates from the newly identified synchronization position.

20. An apparatus according to claim 18, wherein the controller is further programmed to:
   initiate braking of the shift actuator just before reaching the identified mean synchronization position, and
   accelerate the shift actuator towards the identified end of the transmission synchronization operation.

21. An apparatus according to claim 18, wherein the controller is programmed to identify the synchronization position based upon a reduction of the detected rotating speed of the shift actuator.

22. An apparatus according to claim 18, wherein the controller is programmed to identify the end of the synchronization operation is determined based upon an increase of the detected rotating speed of the shift actuator.

23. An apparatus according to claim 18, wherein the controller is programmed to identify the synchronization position and the end of the synchronization operation for each of a plurality of gear stages of the automated shiftable transmission.

24. An apparatus according to claim 18, further comprising means for issuing an action notification when a change in the mean synchronization position relative to a neutral position has exceeded a predetermined change threshold value.

25. An apparatus according claim 19, further comprising means for controlling movement of the shift actuator using stored synchronization position so as to reduce a traveling speed of shift elements in the automated shiftable transmission prior to reaching the stored synchronization position.

* * * * *